(12) United States Patent
Fenney

(10) Patent No.: US 10,768,898 B2
(45) Date of Patent: *Sep. 8, 2020

(54) EFFICIENT MODULO CALCULATION

(71) Applicant: Imagination Technologies Limited, Kings Langley (GB)

(72) Inventor: Simon Fenney, St Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,048

(22) Filed: Dec. 12, 2019

(65) Prior Publication Data

US 2020/0117426 A1    Apr. 16, 2020

Related U.S. Application Data

(63) Continuation of application No. 16/130,691, filed on Sep. 13, 2018, now Pat. No. 10,528,325, which is a continuation of application No. 15/163,848, filed on May 25, 2016, now Pat. No. 10,101,970.

(30) Foreign Application Priority Data

May 27, 2015    (GB) .................................. 1509096.2

(51) Int. Cl.
    *G06F 7/72* (2006.01)
    *G06F 5/01* (2006.01)
    *G06F 7/483* (2006.01)

(52) U.S. Cl.
    CPC ............... *G06F 7/729* (2013.01); *G06F 5/01* (2013.01); *G06F 7/483* (2013.01); *G06F 7/72* (2013.01)

(58) Field of Classification Search
    None
    See application file for complete search history.

(56) References Cited

U.S. PATENT DOCUMENTS

| | | | |
|---|---|---|---|
| 5,289,397 | A | 2/1994 | Clark et al. |
| 5,724,279 | A | 3/1998 | Benaloh et al. |
| 6,366,940 | B1 | 4/2002 | Ono et al. |
| 6,748,410 | B1 | 6/2004 | Gressel et al. |
| 7,194,088 | B2 * | 3/2007 | Langston .................. G06F 7/72 380/28 |

(Continued)

*Primary Examiner* — Michael D. Yaary
(74) *Attorney, Agent, or Firm* — Potomac Law Group, PLLC; Vincent M DeLuca

(57) ABSTRACT

Hardware logic is arranged to efficiently perform modulo calculation with respect to a constant value b. The hardware logic comprises a series of addition units (each comprising a plurality of binary adders). A first stage addition unit in the series groups bits from an input number into a number of strings, multiplies each string by a corresponding coefficient using adders and left-shifting and adds the resulting strings together to generate an intermediate value which, in most examples, has a smaller range of possible values than the input number. The series of addition units also includes a second stage addition unit and/or a final stage addition unit. A second stage addition unit uses similar methods to generate an updated intermediate value in a pre-defined terminating range. A final stage addition unit generates a final result from the final intermediate result output by an immediately previous addition unit in the series.

17 Claims, 3 Drawing Sheets

(56) References Cited

U.S. PATENT DOCUMENTS

| | | |
|---|---|---|
| 7,849,125 B2 | 12/2010 | Shen |
| 8,229,109 B2 | 7/2012 | Hasenplaugh et al. |
| 8,819,098 B2 | 8/2014 | Hirsch et al. |
| 9,485,087 B2 * | 11/2016 | Van Assche ............ H04L 9/002 |
| 9,543,963 B2 | 1/2017 | Carlough et al. |
| 2003/0074382 A1 * | 4/2003 | Schmandt ............... G06F 7/535 |
| | | 708/491 |
| 2004/0083251 A1 | 4/2004 | Geiringer et al. |

* cited by examiner

EFFICIENT MODULO CALCULATION

CROSS-REFERENCE TO RELATED APPLICATIONS AND CLAIM OF PRIORITY

This application is a continuation under 35 U.S.C. 120 of copending application Ser. No. 16/130,691 filed Sep. 13, 2018, which is a continuation of prior application Ser. No. 15/163,848 filed May 25, 2016, now U.S. Pat. No. 10,101,970, which claims foreign priority under 35 U.S.C. 119 from United Kingdom Application No. 1509096.2 filed May 27, 2015.

BACKGROUND

There are a number of known techniques for calculating the modulus of a number with respect to another number in hardware logic (e.g. for calculating y=a mod b, where a and b are integers and y is the remainder of the division a/b). Such hardware logic may form part of a processor such as a central processing unit (CPU) or graphics processing unit (GPU). One example method calculates the modulus as a by-product of an iterative division implementation (e.g. an iterative division which calculates a/b). However, where the value of 'b' is constant, it may be possible instead to use lookup tables and multiplexers (e.g. where a is not too large). Given the binary nature of most computer mathematics, calculations where the constant b is a power of two are trivial to perform and further, where b is a multiple of a power of 2, the calculation can be simplified by first performing the trivial division and modulus of the power of 2 factor and then recombining subsequently. The operation of calculating the modulus of a number with respect to a constant may be referred to as modulo (or modulus) calculation or the modulo operation.

The embodiments described below are provided by way of example only and are not limiting of implementations which solve any or all of the disadvantages of known methods of implementing modulo calculation in hardware logic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hardware logic is described which is arranged to efficiently perform modulo calculation with respect to a constant value b. The hardware logic comprises a series of addition units (each comprising a plurality of binary adders). A first stage addition unit in the series groups bits from an input number into a number of strings, multiplies each string by a corresponding coefficient using adders and left-shifting and adds the resulting strings together to generate an intermediate value which, in most examples, has a smaller range of possible values than the input number. The series of addition units also includes a second stage addition unit and/or a final stage addition unit. A second stage addition unit uses similar methods to generate an updated intermediate value in a pre-defined terminating range. A final stage addition unit generates a final result from the final intermediate result output by an immediately previous addition unit in the series.

A first aspect provides an apparatus comprising hardware logic arranged to perform modulo calculation with respect to a constant value b, the hardware logic comprising a series of addition units, the series of addition units comprising a first addition unit and at least one further addition unit selected from a second addition unit and a final addition unit, wherein: the first addition unit is arranged to receive an input n-bit value, group the bits of the value received by the unit into a plurality of strings, perform a multiplication of each string by a corresponding coefficient using adders and left-shifting, add together all resulting strings to generate an intermediate value comprising a plurality of number bits and a sign bit and output the intermediate value; the second addition unit is arranged to receive an intermediate value output by an immediately previous addition unit in the series of addition units, group the bits in the value received by the unit into a plurality of strings, perform a multiplication of each string by a corresponding coefficient using adders and left-shifting, add together all resulting strings to generate an updated intermediate value comprising a plurality of number bits and a sign bit and output the updated intermediate value; and the final addition unit is arranged to receive a final intermediate value output by an immediately previous addition unit in the series of addition units, the final intermediate value being in a pre-defined terminating range, to divide the value received by the unit into a first string comprising the plurality of number bits and, where the sign bit is non-zero, a second string comprising only the non-zero sign bit, perform a multiplication of the second string by a corresponding coefficient using adders and left-shifting, add together the resulting string and the first string to generate a first candidate output value in a range [0,b−1] and output an output value, wherein the output value is selected from one or more generated candidate output values; and for at least one string in the first or second addition units, the corresponding coefficient comprises a selected one of $2^i$ mod b and $(2^i$ mod b$)-$b having a smaller absolute magnitude and where i is a bit index of a least significant input bit in the string.

A second aspect provides a non-transitory computer readable storage medium having stored thereon computer readable instructions that, when processed at a computer system for generating a manifestation of an integrated circuit, cause the computer system to generate a manifestation of an integrated circuit arranged to perform modulo calculation, the integrated circuit comprising a series of addition units, the series of addition units comprising a first addition unit and at least one further addition unit selected from a second addition unit and a final addition unit, wherein: the first addition unit is arranged to receive an input n-bit value, group the bits of the value received by the unit into a plurality of strings, perform a multiplication of each string by a corresponding coefficient using adders and left-shifting, add together all resulting strings to generate an intermediate value comprising a plurality of number bits and a sign bit and output the intermediate value; the second addition unit is arranged to receive an intermediate value output by an immediately previous addition unit in the series of addition units, group the bits in the value received by the unit into a plurality of strings, perform a multiplication of each string by a corresponding coefficient using adders and left-shifting, add together all resulting strings to generate an updated intermediate value comprising a plurality of number bits and a sign bit and output the updated intermediate value; and the final addition unit is arranged to receive a final intermediate value output by an immediately previous addition unit in the series of addition units, the final intermediate value being in a pre-defined terminating range, to divide the value received by the unit into a first string comprising the plurality of number bits and, where the sign-bit is non-zero, a second string comprising only the non-zero sign bit, perform a multiplication of each string by a corresponding coefficient using adders and left-shifting, add together the resulting string and the first string to generate an output value in a range [0,b−1] and output the output value, wherein the output value is selected from one or more generated candidate output values; and for at least one string in the first or second addition units, the corresponding coefficient comprises a selected one of $2^i$ mod b and ($2^i$ mod b)−b having a smaller absolute magnitude and where i is a bit index of a least significant input bit in the string.

A third aspect provides a computer readable storage medium for generating a processor configured to: receive an input n-bit number; group the bits of the input number into a plurality of strings; perform a multiplication of each string by a corresponding coefficient using adders and left-shifting; add together all resulting strings to generate an intermediate value comprising a plurality of number bits and a sign bit; group the bits in the intermediate value into a second plurality of strings; perform a multiplication of each string in the second plurality of strings by a corresponding coefficient using adders and left-shifting; add together all resulting strings to generate an updated intermediate value comprising a plurality of number bits and a sign bit, the updated intermediate value being in a pre-defined terminating range; divide the updated intermediate value into a first string comprising the plurality of number bits and, where the sign bit is non-zero, a second string comprising only the non-zero sign bit; perform a multiplication of each string by a corresponding coefficient using adders and left-shifting; and add together the resulting string and the first string to generate an output value in a range [0,b−1], wherein the output value is selected from one or more generated candidate output values; and for at least one string in the first or second addition units, the corresponding coefficient comprises a selected one of $2^i$ mod b and ($2^i$ mod b)−b having a smaller absolute magnitude and where i is a bit index of a least significant input bit in the string.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
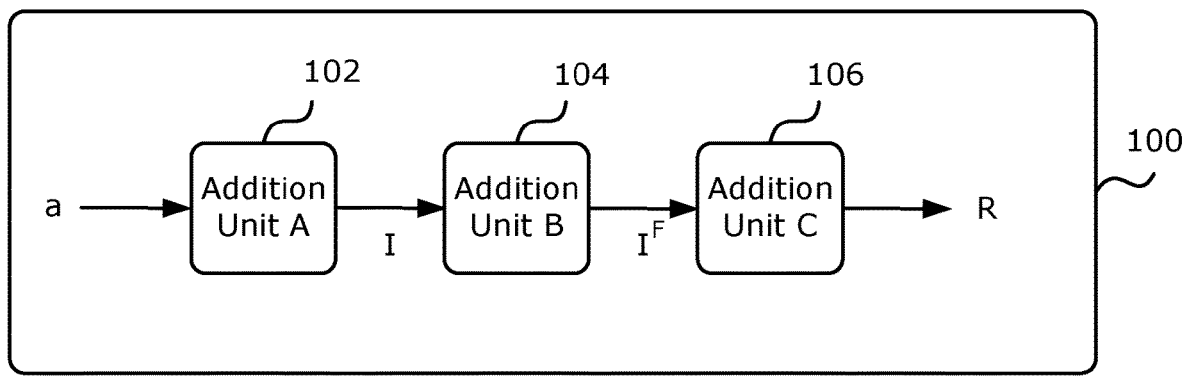
FIG. 1 is a schematic diagram showing two example hardware units each comprising hardware logic arranged to implement an efficient method of modulo calculation.
Figure 1:
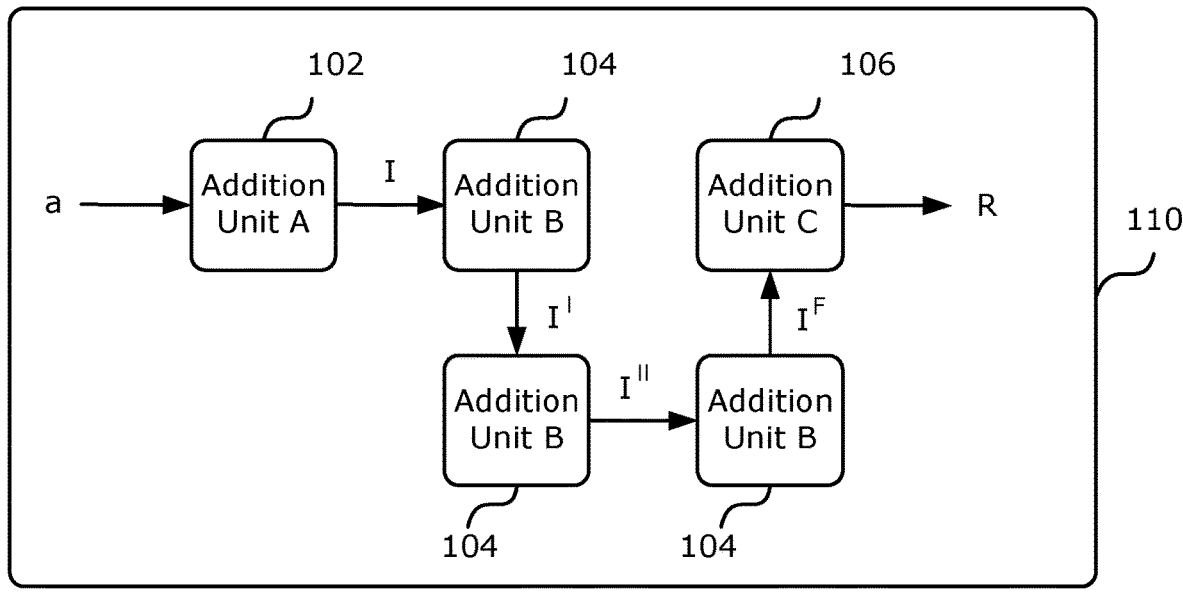

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Another method which calculates the modulus of an n-bit number, a, with respect to an unsigned m-bit constant, b, involves mapping each bit in number a, denoted a[i], to $2^i$ mod b which gives n m-bit numbers (one for each bit in number a). The n m-bit numbers can then be added together, with an optional subtract b (or a multiple of b) if the value of any addition is greater than b. This method is typically small (in terms of area of hardware logic required to implement it) but slow due to the use of additions and optional subtractions.

Existing hardware logic which calculates the modulus (a mod b) of an n-bit number a with respect to an unsigned m-bit constant b (where a, b, n and m are integers and where b can be assumed to be positive) is either small (in terms of area of hardware logic) but slow to perform the calculation or faster but larger in terms of area. There are many reasons why hardware logic is required which is arranged to calculate the modulus of an n-bit number, such as for calculating addresses for efficient memory storage of frame buffers with non-power of 2 dimensions/strides, efficiently mapping addresses/work to N known cache/processor units when N is not a power of 2 and unpacking symbols from a data stream where those symbols belong to a non-power of 2 alphabet.

Efficient methods of modulo calculation are described below which involve splitting up the input n-bit number a and grouping the bits into a series of strings. The strings may all be the same length or may have different lengths and comprise one or more bits from the input number a, where the bits in a given string may not necessarily have been contiguous in the original n-bit number. Each bit string is mapped to a new range of values which are effectively congruent, modulo b, to the original values represented by those bits in the input n-bit number a. The methods may be implemented in hardware logic which comprises a series of addition units, each addition unit comprising a plurality of binary adders where a subset of the binary adders in any addition unit operate in parallel and where the term 'binary adder' is used herein to refer to a two's complement binary adder.

In various examples, the methods described herein reduce the range of possible values of an intermediate value which is output from one addition unit and input into the next addition unit in the series. This means that the bit width of the intermediate value (i.e. the number of bits which are required to store the intermediate value which can have any value in the range of possible values) is often reduced by 1 or more bits. In various examples, the magnitude of the intermediate values may be reduced to around one quarter of those of an alternative scheme which used only coefficients in the range [0,b−1]; however many of the methods described herein do maintain a sign bit.

The reduced bit width of the intermediate values output by an addition unit has an effect on the possible range of values for the next intermediate value (output by the next addition unit in the series) and this reduces the amount of logic required to perform the calculation (e.g. reduces logic area within addition units). This method provides flexibility to design hardware logic for a particular application (with particular values of n and b) which is optimal for speed or optimal for area or to meet target speed and area requirements. As described in more detail below, the flexibility is provided through the ability to select how the bits from the n-bit input number a are grouped into the strings (e.g. which bits $a_i$ form each string), and through the selection of the corresponding coefficients by which each string is multiplied (with each string being multiplied by its own corresponding coefficient).

FIG. 1 is a schematic diagram showing two example hardware units 100, 110 each comprising hardware logic arranged to implement an efficient method of modulo calculation, i.e. calculation of a mod b where a is an n-bit number and b is an unsigned m-bit constant and may be assumed to be positive. The hardware units may, for example, be processors (e.g. a CPU or GPU) or a piece of dumb, non-programmable logic. The hardware logic within the hardware units 100, 110 comprises a plurality of addition units 102-106. In the first example hardware unit 100 there are 3 addition units: addition unit A 102, addition unit B 104 and addition unit C 106. As described above, each addition unit 102-106 comprises a plurality of binary adders, a subset of which operate in parallel. An addition unit may also comprise additional hardware logic elements.

Although each addition unit 102-106 operates in a similar manner, they do not operate in exactly the same way as is described in more detail below. Addition unit A 102 performs a first stage of the method of modulo calculation, addition unit B 104 performs a second stage of the method and addition unit C 106 performs a final stage of the method. In some examples, the hardware logic may comprise more than three addition units, in which case the hardware logic comprises a plurality of addition unit Bs 104 which all operate in a similar way but comprise a different combination of hardware logic (e.g. adders) as a consequence of the different input values (i.e. the second stage of the method is repeated). This is shown in the second example hardware unit 110 in FIG. 1 which comprises three instances of addition unit B 104 giving a total of 5 addition units. In other examples there may be fewer than three addition units (e.g. only addition unit A 102 or a combination of addition unit A 102 and addition unit C 106 without an addition unit B 104).

Addition unit A 102 receives the n-bit number, a, and outputs a first intermediate value l which has a smaller range of possible values than a itself. For example, if a can be any positive value in the range, [0, 15], (and thus n=4), and if b=7, the first intermediate value l may be in the range [−3,4]. How exactly this is determined is discussed later, but as can be seen in this example, the first intermediate value l is a signed (i.e. positive or negative) value; however in other examples, it may be unsigned. The first intermediate value l can be stored in n' bits of storage, where and in the example given n'=4 (3 bits+sign bit). Although, in this a∈[0, 15], b=7 example, the number of bits required to represent the intermediate value l has not decreased, relative to that of a, the range has been reduced. The range of possible values of the first intermediate value l (and hence the value of n') will depend upon the value of the constant b and the particular design of the addition unit A 102.

If, for a given example, the range of l is [0, b−1], then no further steps or units are required. If for an example, such as that of where a∈[0, 15], b=7, the range of l is not outside [−b, b−1], then unit C 106 is required. In the more general examples, wherein the resulting range of l exceeds that of [−b, b−1], a number of addition units B 104 will be required.

Addition unit B 104 (or the first addition unit B, if there are multiple of these units) receives the first intermediate value l from addition unit A 102 (where as described above, the range of l exceeds that of [−b, b−1]) and outputs a second (or new) intermediate value l' which in most examples is smaller in range than both a and l and can be stored in n" bits of storage, where n"≤n'≤n. The second intermediate value l' may be a signed value and in which case, the n" bits include a sign bit. The range of possible values of the second intermediate value l' (and hence the value of n") will depend upon the value of the constant b and the particular design of the addition unit B 104. If there is only a single addition unit B 104 within the hardware logic, the output of that addition unit B 104 is denoted $l^F$ for the purposes of explanation (i.e. for a single addition unit B, $l'=l^F$). In many examples, the final intermediate (or penultimate) value l F is in the range [−b,b−1]; however in some examples, the method may be configured to also check for the possibility of [0, b−1] and/or slightly larger ranges which can be easily reduced to [0, b−1] (as described in more detail below).

Where the second intermediate value l' is not in the range [−b,b−1], i.e. where the intermediate value lies within a larger range [−c,d] where c>b and/or d>(b−1), multiple addition unit Bs 104 are included within the hardware logic (e.g. as in hardware unit 110) such that a final intermediate value (or penultimate value) $l^F$ which is output from the last addition unit B in the logical chain is in the range [−b,b−1] (or, for some examples, an alternative terminating condition such as [0,b] or [0,b−1], as these can be easily mapped to the final result). Subsequent addition unit Bs receive an intermediate value from the previous addition unit B in the logical chain (e.g. as shown in FIG. 1) and then output a further intermediate value which has a smaller range of possible values than the intermediate value received. For the purposes of explanation, these further intermediate values are denoted l", l'" etc. FIG. 1 shows the output from one addition unit being the input to the next addition unit. Where an intermediate value includes a sign bit, the sign bit may be interpreted differently in different addition units, e.g. as either a negative value or the corresponding positive value (mod b).

If, the range of l F is [0, b−1], then no further steps or units are required and the value $l^F$ is the result R. Similarly, if the range of $l^F$ is [0, b], then no further steps or units are required and the value $l^F$ is the result R unless the intermediate value is equal to b, in which case the result R=0. Otherwise, addition unit C 106 receives the final intermediate (or penultimate) value $l^F$ from an addition unit B 104 (e.g. the last in the logical chain where there is more than one addition unit B 104) and outputs the result R which will be in the range [0,b−1].

It will be appreciated that FIG. 1 may only show a subset of the elements within the hardware units 100, 110. For example, where the hardware units 100, 110 are processors, a processor will typically comprise many additional elements such as registers, caches, execution pipelines, etc.

Figure 2:
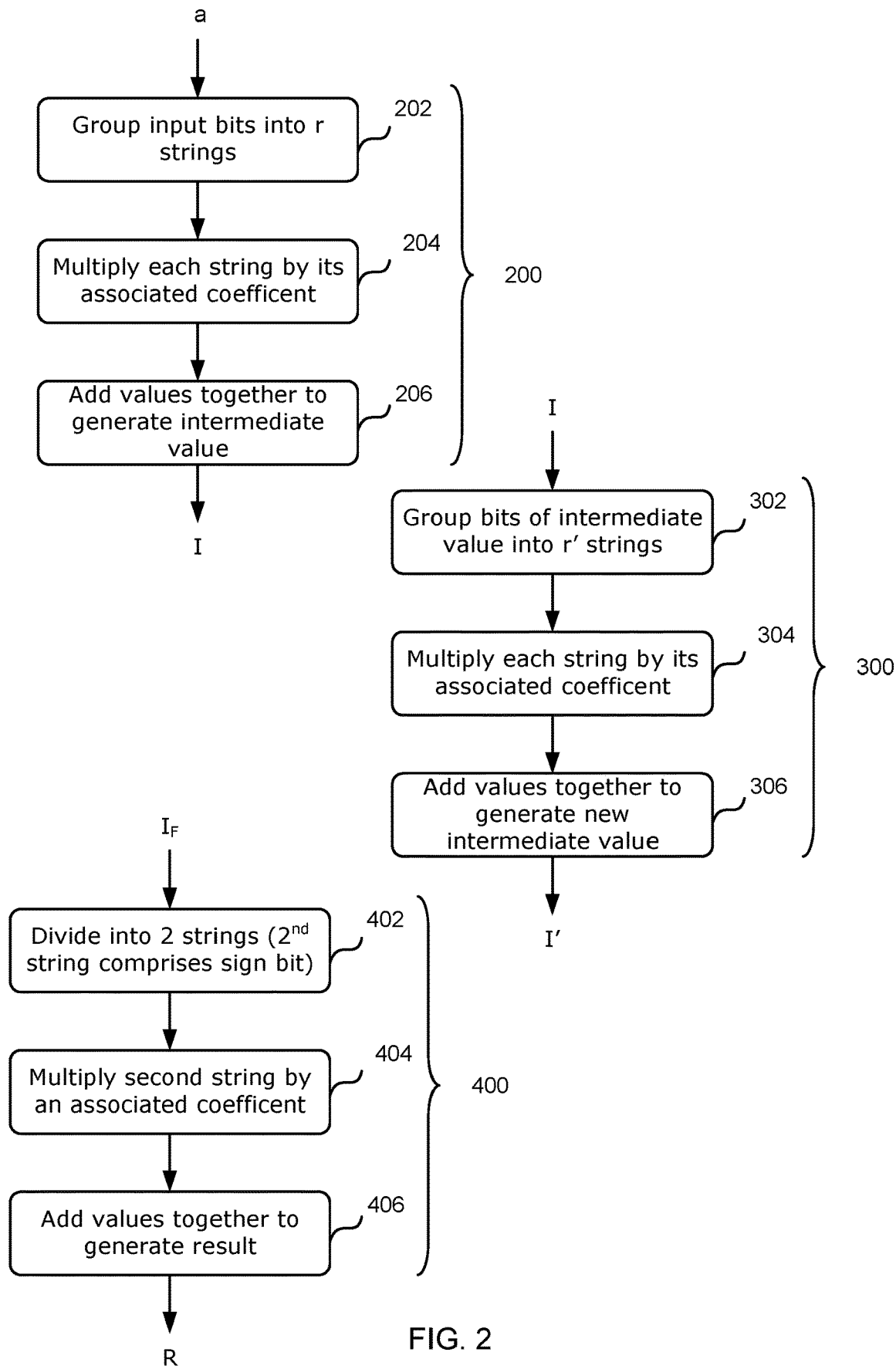
FIG. 2 illustrates flow diagrams showing example methods of operation of the addition units of FIG. 1.

The method of modulo calculation implemented by the hardware logic described above and shown in FIG. 1 are be described in more detail below. FIG. 2 shows flow diagrams of the logical operation of each of the different addition units A, B and C 102-106. As described above, in some examples there may only be an addition unit A or there may be an addition unit A and either at least one addition unit B or an addition unit C or there may be an addition unit A, at least one addition unit B and an addition unit C.

The first flow diagram shows the first stage 200 of the method which is implemented by addition unit A 102. As described above, the first stage 200 of the method (and addition unit A 102) takes as an input an n-bit number, a, where the n-bits, $a_i$, may be denoted $V_0 \ldots V_{n-1}$ where $a=V_0 2^0 + V_1 2^1 \ldots V_{n-1} 2^{n-1}$. The input bits $a_i$ are grouped together to form a plurality of strings (block 202), e.g. r strings where r is a natural number. Each string comprises one or more bits, and different strings may comprise different numbers of bits. Further, the different bits in each string need not have been contiguous in the input, and further, bits may be used multiple times in various strings (as is described below). The grouping of bits to form strings is determined when designing the hardware logic and is then fixed within the hardware logic.

Each string is then effectively multiplied by a coefficient which corresponds to the particular string (block 204) and the resultant values are added together (block 206) in a series of binary adders to produce the intermediate value 1. However, in many examples, the hardware logic used may not perform any multiplication operations and instead the multiplication may be effected through use of adders and in some examples by left shifting bits. This is described in more detail below. The coefficient by which a string is "multiplied" (in block 204) depends on exactly which bits of the input a are in the string and the value of the constant b and this is described in detail below. In some examples, some strings which would be 'multiplied' by related coefficients, e.g. the same coefficient or coefficients of the same magnitude but opposite sign, may be pre-added or subtracted, prior to performing the multiplication.

The resultant arrangement of hardware logic within addition unit A 102 comprises a tree of full adders which comprises many adders which operate in parallel and a suitable adder architecture may be determined by a synthesis tool once the strings, coefficients and methods for effecting multiplication have been determined. There are many different ways that full adders can be implemented in hardware. At the first level in the tree, the full adders reduce the overall number of bits which are being added together from n to around 2n/3 and each subsequent level in the tree reduces the number of values which are being added together by another factor of around ⅔. The resultant intermediate value 1 comprises n' bits, including a sign bit.

Although the above description assumes that the input to addition unit A is unsigned (e.g. is a positive value), in various examples, the input number may be signed with the sign bit in the most significant bit, bit J, with the least significant bit being bit 0. In such an example, the sign bit is effectively the value $-2^J$ and this can be represented as $-(2^J \bmod b)$ or $b-(2^J \bmod b)$, or another value that is congruent, depending on which gives the best resulting range for the first intermediate value 1, and/or results in lower cost hardware. For the purposes of the following examples only, it is assumed that the initial input values are unsigned.

The grouping of input bits $a_i$ into the strings (in block 202) may be determined (e.g. as part of the design process for the hardware logic within addition unit A 102) by first mapping each bit, $a_i$, to one of:

i. the positive coefficient value in $[0, \ldots, b-1]$ which is congruent to $2^i \bmod b$
ii. whichever of $(2^i \bmod b)$ or $((2^i \bmod b)-b)$ has the smaller absolute magnitude (noting that the latter of the pair will be negative, and that the smaller absolute magnitude will be $\leq b/2$).
iii. as in (ii) but allowing choice of the larger congruent value magnitude value provided its magnitude is only slightly bigger than $\pm b/2$, particularly if the coefficient value is either 'simpler' than the smaller magnitude option (i.e. it can be 'constructed' from fewer powers of two via addition or subtraction), or is less in magnitude than b and is a 2× multiple of the another bit's coefficient.
iv. Choosing one of the two (or more) options of (ii) (or (iii)), by performing the equivalent of considering all the possible $2^n$ (or more) combinations of option choices for the n $a_i$, and running a heuristic cost metric on each combination (as described below in many cases this does not require $2^n$ evaluations to be performed). The combination which minimizes this cost metric is chosen.
v. any of (i)-(iv) but favouring selection of coefficients which are a signed power of two, including allowing the coefficient value to go outside the ±b range (e.g. up to ±K*b, where K is a natural number) if the coefficient remains a signed power of two
vi. Testing any combination of (i)-(v) and using the one that yields the least cost result.

The method (iv) above uses a cost metric which is applied to each of the combinations. For a given combination h of the $2^n$, (or more combinations), suitable metrics can be obtained by first computing the range of possible sums, $[Min_h, Max_h]$, where $Min_h$ is the minimum possible value of the sum of the given combination and $Max_h$ is the maximum possible value of the sum of the given combination, noting that $Min_h \leq 0 \leq Max_h$, and/or the sum of the costs of representing each of then chosen values, and then evaluating one of:

a) The number of bits required to represent any value in the range $[Min_h, Max_h]$,
b) The result of evaluating $(Max_h - Min_h)$
c) Evaluating $\max(-Min_h, Max_h)$
d) The sum of the costs of representing each of the n values
e) Any choice of the (a) ... (d), but resorting to the other metrics for the purposes of tie breaking.

Here the "cost of representing a value" (which is also used in option (iii)) is defined to be the size of the smallest set of powers of two such that there exists an expression involving sums and differences of that set which equates to that value. For example, the cost of "15" is "2" since it can be expressed as "$2^4-2^0$".

The method of option (v) may be worth investigating in cases where (I) b divides either $2^k-1$ or $2^k+1$, and $2^k$ is only up to a 'few bits larger' than b, and (II) n, the number of bits needed to represent the input value, a, is significantly greater than the number of bits required to represent b. For example, b=683, which divides $2^{11}-1$, with, say, n>16 may be such a candidate for which investigating this option may yield benefits.

In a first example implementation, all bits are mapped, for example using (ii) from above, to either a positive coefficient or a negative coefficient in the range $[-\text{floor}(b/2), \ldots, \text{floor}(b/2)]$, where the coefficients $C_i$ for an input bit $a_i$ are given by:

$$2^i \bmod b \qquad \text{Positive coefficient:}$$

$$(2^i \bmod b)-b \qquad \text{Negative coefficient:}$$

Having mapped all the bits to a coefficient, the input bits are formed into strings.

The values of the coefficients used (in block 204) can be described as follows and given the notation for a above, the modulo calculation being performed can be written:

$$a \bmod b = (V_0 2^0 + V_1 2^1 + \ldots + V_{n-1} 2^{n-1}) \bmod b$$

If a is formed into r strings, $X_0, X_1, \ldots, X_{r-1}$, then $$a \bmod b = (X_0 D_0 + X_1 D_1 + \ldots + X_{r-1} D_{r-1}) \bmod b$$

where $D_0, D_1, \ldots, D_{r-1}$ are the series of coefficients (which are used in block 204) which are dependent upon both the value of b and the selection of the bits of a used to create the r strings. If a string $X_s$ is formed from bits $V_i$ to $V_j$, where $j \geq i$, then the coefficient which that string is multiplied by (in block 204) may be given by $2^i \bmod b$ or $(2^i \bmod b)-b$.

As a more concrete example, consider b=13, applied to a 12-bit number (n=12), thus $a \in [0, 2^{12}-1]$, using the mapping scheme described in option (ii). The resulting mapping is thus:

| | i | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| $2^i$ | 2048 | 1024 | 512 | 256 | 128 | 64 | 32 | 16 | 8 | 4 | 2 | 1 |
| $V_i$ | $V_{11}$ | $V_{10}$ | $V_9$ | $V_8$ | $V_7$ | $V_6$ | $V_5$ | $V_4$ | $V_3$ | $V_2$ | $V_1$ | $V_0$ |
| Coefficient, Ci, choice according to (ii): | −6 | −3 | 5 | −4 | −2 | −1 | 6 | 3 | −5 | 4 | 2 | 1 |

A set or multi-bit strings are identified by finding input bits (not necessarily contiguous but that, in practice, very likely will be except, for example, where bits are used in more than one string) that correspond to runs of $C_i$ values which are progressively scaled by 2, with the corresponding $D_i$ coefficient being equal to the smallest $C_i$ coefficient in each run. This thus finds:

| | String | | | |
|---|---|---|---|---|
| | $X_3$ | $X_2$ | $X_1$ | $X_0$ |
| Input Bits | $V_{11}V_{10}$ | $V_8V_7V_6$ | $V_5V_4$ | $V_1V_0$ |
| Coefficient $D_i$ | −3 | −1 | 3 | 1 |

These strings are 'multiplied' by their respective coefficients: This is performed by converting each coefficient to a minimal summation of signed powers of 2. For example, 3 would equivalent to "$2^1+2^0$" (or alternatively $2^2-2^0$, and −5, "$-2^4-2^0$") and then performing the appropriate left shifting and addition (e.g. 'multiplying' by 3 which is equivalent to $2^1+2^0$ corresponds to adding the string to a version of the string which is left shifted by 1 bit).

In this example, the remaining bits, $V_3$ & $V_9$, are treated individually as $X_4$ & $X_5$. These strings can now be used to assemble binary values and summed to produce the intermediate value l:

| I = | + "$V_2V_1V_0$" | # $X_0$ * 1 |
|---|---|---|
| | + "$V_5V_40$" + "$V_5V_4$" | # $X_1$ * 3 |
| | − "$V_8V_7V_6$" | # $X_2$ * −1 |
| | − "$V_{11}V_{10}0$" − $V_{11}V_{10}$" | # $X_3$ * −3 |
| | − "$V_30V_3$" | # $X_4$ * −5 |
| | + "$V_90V_9$" | # $X_5$ * 5 |

As all possible {0,1} settings of the Vi are assumed possible, the range of l can be seen to be [Σ(AllNegativeValues), Σ(AllPositiveValues)] which, in this examples, is [−21, 21], and thus l can be represented by a 6 bit signed value.

As an alternative strategy, the initial string gathering pass is first restricted to only find multi-bit strings for which the $C_i$ coefficients are not (signed) powers of 2. These strings are then 'multiplied' by the corresponding Di coefficients and put back into a 'table' of Coefficients VS input bits, along with original 'power of 2' values. For the $a \in [0, 2^{12}-1]$, b=13 example, this produces:

| Power of 2 | Input Bits |
|---|---|
| 1 | $V_0$, $V_4$, |
| 2 | $V_1$, $V_4$, $V_5$, |
| 4 | $V_2$, $V_5$ |
| −1 | $V_6$, $V_{10}$, |

-continued

| Power of 2 | Input Bits |
|---|---|
| −2 | $V_7$, $V_{10}$, $V_{11}$, |
| −4 | $V_8$, $V_{11}$, |

In one variant, the "single bit" strings can also be 'multiplied' and included in the "power of" table. For the $a \in [0, 2^{12}-1]$, b=13 case, $V_3$ would be added to lists "−4" and "−1" and $V_9$ to "4" and "1". Strings with (signed) binary-only coefficients can then be formed by removing and concatenating bits from this table. One example, created using this approach, is:

l=+"$V_2V_1V_0$"+"$V_5V_4V_4$"
  +"$V_9V_5V_9$"
  −"$V_3V_7V_3$"
  −"$V_8V_{10}V_6$"
  −"$V_4V_{11}V_{10}$"

In a second variant, the 'single bit' strings are not immediately added to the power of 2 table, but are first analysed. Pairs with complementary coefficients, i.e. same magnitude but opposite sign, are identified. In the $a \in [0, 2^{12}-1]$, b=13 example, $V_3$ and $V_9$ are such a pair. Each such pair can be combined to create 3 possible outcomes: Using the example of V3 and V9 from $a \in [0, 2^{12}-1]$, b=13, this is:

| $V_3$ | $V_9$ | Resulting Value | Resulting Value as signed, 4-bit number |
|---|---|---|---|
| 0 | 0 | 0 | 0000 |
| 0 | 1 | 5 | 0101 |
| 1 | 0 | −5 | 1011 |
| 1 | 1 | 0 | 0000 |

Those familiar with Boolean logic will appreciate that the pair of input bits can be trivially mapped to these values with only a handful of logic gates—for example the least significant bit of the resulting value in the above table can be expressed as "$V_3$ XOR $V_9$", while bits 1 and 3 are produced with "$V_3$ AND NOT $V_9$". This mapping could be done explicitly or could be left to a suitable hardware synthesis tool.

Similarly, if pairs of 'single bit' strings are present that map to the same value, say $C_{same}$, these can be encoded in a related way to three possible outcomes: 0, $C_{same}$ and 2*$C_{same}$. Although such a case does not occur in the $a \in [0, 2^{12}-1]$, b=13 example, it is not uncommon with other choices of modulus. These resulting decoded values can then be included in the sum of strings. Any remaining, unpaired values are included in the summation as before.

In another more complex example, with b=43, the positive and negative coefficients for each bit in a 20-bit number (n=20) using approach (iii) are as follows (with the coefficients with a magnitude which is less than b/2 being underlined, (i.e. those corresponding to option (ii) earlier), and those being chosen as per rule (iii) contained in parentheses):

| | i | | | | | | | | | |
|---|---|---|---|---|---|---|---|---|---|---|
| | 9 | 8 | 7 | 6 | 5 | 4 | 3 | 2 | 1 | 0 |
| $2^i$ mod b | 39 | 41 | 42 | _21_ | 32 | (16) | (8) | (4) | (2) | (1) |
| ($2^i$modb) − b | (−4) | (−2) | (−1) | (−22) | (−11) | −27 | −35 | −39 | −41 | −42 |
| $V_i$ | $V_9$ | $V_8$ | $V_7$ | $V_6$ | $V_5$ | $V_4$ | $V_3$ | $V_2$ | $V_1$ | $V_0$ |

| | I | | | | | | | | | |
|---|---|---|---|---|---|---|---|---|---|---|
| | 19 | 18 | 17 | 16 | 15 | 14 | 13 | 12 | 11 | 10 |
| $2^i$modb | 32 | (16) | (8) | (4) | (2) | (1) | (22) | (11) | 27 | 35 |
| ($2^i$modb) − b | (−11) | −27 | −35 | −39 | −41 | −42 | _−21_ | −32 | (−16) | (−8) |
| $V_i$ | $V_{19}$ | $V_{18}$ | $V_{17}$ | $V_{16}$ | $V_{15}$ | $V_{14}$ | $V_{13}$ | $V_{12}$ | $V_{11}$ | $V_{10}$ |

In this example with b=43 and n=20, the input may be formed into strings to avoid values of i where although the magnitude of the coefficient is greater than b/2, it is still related to the another coefficient (e.g. for i=6 and l=13 where by default (i.e. option (ii)) the coefficients would be 21 and −21 respectively; however, the alternatives, −22 and 22 respectively, are only slightly larger in magnitude and form a contiguous runs with the previous values, for i=5 and l=12, of −11 and 11 respectively). In this particular example, the input is divided into 6 strings at positions given by l=0,5,7,12,14,19 and with corresponding coefficients: +1, −11, −1, +11, +1, −11.

When forming the r strings from the input a, the value of the coefficient (whether positive or negative) is not the only variable to be considered. When calculating the possible range of values of l, each coefficient is multiplied by the maximum possible value of the string (i.e. the value of the string if all the bits were ones). This is the equivalent operation to using [Σ(AllNegativeValues), Σ(AllPositiveValues)] as set out above. Consequently, by limiting the lengths of the strings and in particular the lengths of any strings with large coefficients, the range of possible values of l is limited.

In this example with b=43 and n=20, the range of possible values of l is:

[(−1*31)+(−11*3)+(−11*1),(+1*31)+(+11*3)+(+1*31)]=[−75,+95]

which can be represented in 8 bits (7 bits plus a sign bit). This range is significantly smaller than the range would have been if only positive coefficients had been used (being [0, 364]). Note that although this range is slightly greater than that produced by option (ii), i.e, [−74, 94], the summation might be less costly to implement in a given silicon technology.

In another example where b=43 and n=20, the selection (in block 202) aggressively selects powers of two (as per option (v) above). This has the effect that the bits are mapped to the following coefficients:

| Bit | Coefficient |
|---|---|
| 0 | +1 |
| 1 | +2 |
| 2 | +4 |
| 3 | +8 |
| 4 | +16 |
| 5 | +32 |

-continued

| Bit | Coefficient |
|---|---|
| 6 | +64 |
| 7 | −1 |
| 8 | −2 |
| 9 | −4 |
| 10 | −8 |
| 11 | −16 |
| 12 | −32 |
| 13 | −64 |
| 14 | +1 |
| 15 | +2 |
| 16 | +4 |
| 17 | +8 |
| 18 | +16 |
| 19 | +32 |

The input is then formed (e.g. divided) into 3 strings at positions given by i=0,7,14 and with corresponding coefficients: +1, −1, +1. This gives a range of possible values of/of:

[(−1*127)),(+1*127)+(+1*63)]=[−127,+190]

which can be represented in 9 bits (8 bits plus a sign bit). Although this range required one more bit than that required for the option (iii) (or option ii) case, it results in a far simpler expression for the first step of addition, and so, overall, may save hardware (though, again, this may depend on choice of the silicon technology used, clock speed etc.).

In another example where b=25 and n=20 both the positive and negative coefficients options of (ii), are shown in the table below, with the coefficients which are chosen according to option (iv)&(ii) using a cost metric based on, in order of priority, (a)&(b)&(d), underlined

| | i | | | | | | | | | |
|---|---|---|---|---|---|---|---|---|---|---|
| | 9 | 8 | 7 | 6 | 5 | 4 | 3 | 2 | 1 | 0 |
| $2^i \bmod b$ | 12 | 6 | 3 | 14 | 7 | 16 | 8 | 4 | 2 | 1 |
| $(2^i \bmod b) - b$ | −13 | −19 | −22 | −11 | −18 | −9 | −17 | −21 | −23 | −24 |
| $V_i$ | $V_9$ | $V_8$ | $V_7$ | $V_6$ | $V_5$ | $V_4$ | $V_3$ | $V_2$ | $V_1$ | $V_0$ |

| | i | | | | | | | | | |
|---|---|---|---|---|---|---|---|---|---|---|
| | 19 | 18 | 17 | 16 | 15 | 14 | 13 | 12 | 11 | 10 |
| $2^i \bmod b$ | 13 | 19 | 22 | 11 | 18 | 9 | 17 | 21 | 23 | 24 |
| $(2^i \bmod b) - b$ | −12 | −6 | −3 | −14 | −7 | −16 | −8 | −4 | −2 | −1 |
| $V_i$ | $V_{19}$ | $V_{18}$ | $V_{17}$ | $V_{16}$ | $V_{15}$ | $V_{14}$ | $V_{13}$ | $V_{12}$ | $V_{11}$ | $V_{10}$ |

In this example, four runs of sequences of doubling values can be clearly identified as ($V_0 \ldots V_3$, $V_7 \ldots V_9$, $V_{10} \ldots V_{13}$, and $V_{17} \ldots V_{19}$). Similarly, pairs of bits with the same magnitude of coefficient but opposite sign can be identified (e.g. $V_5$ and $V_{16}$), such that:

$$(V_6 \times -11) + (V_{16} \times 11) = (V_{16} - V_6) \times 11$$

As described above, in various examples, an input bit can be used in multiple strings. For example, a bit which has a coefficient which can be written as a series of powers of two (e.g. 17=16+1, 7=8−1, etc.) can be included in a number of strings, i.e. the input bit is considered to be a plurality of input bits, each having a coefficient which is a power of two. For example, referring to the b=25 example above:

$$V_5 \times 7 = (V_5 \times 8) + (V_5 \times -1)$$

and so the input bit $V_5$ may be included twice (in the same or different strings) with different coefficients, each of which are a power of two. This may also be used where the coefficient cannot be written as an exact series of powers of two, but instead one or more powers of two can be "split off" leaving a residual coefficient which is not a power of two. If, in a given example, $V_x$ maps to "−7" and $V_y$ maps to "11", then $V_x$'s coefficient could be split into "−4" and "−3", $V_y$ to "8" and "3". The powers of 2 handled can as before, and the "−3" and "3" paired as above.

The method of grouping input bits into strings (in block 202) may therefore be considered to be a process of allocating input bits to 'buckets' which correspond to coefficients which are a power of two (e.g. an input bit is allocated to one or more buckets, as described above) and then forming strings by selecting an input bit from the '+1' bucket, a string from the '+2' bucket, a string from the '+4' bucket, etc. or from the corresponding negative coefficient buckets. For those input bits that are not allocated to a bucket, they may remain as single bit strings or may be combined with other bits using any of the methods described above. There may be some bits which are left as single bit strings, such as where there are pairs of bits with the same magnitude of coefficient, C, but with opposite signs and pairs of bits with the same coefficient C' i.e. same magnitude and same sign. In both these cases, the pair of bits may remain as two 1-bit strings.

As described above, when bits are grouped into strings (in block 202) a resulting string may comprise a plurality of contiguous bits from the input string and/or a plurality of non-contiguous bits from the input string and/or a repeated bit (i.e. where the same bit is included more than once in the same string) and/or bits arranged in a different order to the original input string. An example in which bits in a string are contiguous and repeating can be described: considering an 11 bit number modulo 11 (i.e. n=11, b=11), bits 1=9 and 1=10 map to 6 and 1 respectively and so a string may be formed from bits $V_9 V_9 V_{10}$.

Having grouped input bits into strings (in block 202) using one of the methods described above (or a combination of any of the methods described), there are many techniques which may be used in order to implement the multiplication step (block 204) without use of multipliers. For example:

a) If the string if the string is to be "multiplied" by a power of 2 (be it positive or negative) the string is "left-shifted" by the appropriate amount and optionally negated, e.g. where a string 111 is to be "multiplied" by a coefficient equal to 4 (or 100 in binary), it is left-shifted by two places to give 11100;

b) If there is a pair of 1-bit strings such that one is to be "multiplied" by a coefficient "C" and the other by "−C", (where |C| is not a power of two), the string bits are 'pre-combined' such that if both='0' or both='1' then the "multiplication" produces "0" else will produce either "C" or "−C" as appropriate. This may also be extended to multi-bit strings;

c) If there is a pair of 1-bit strings such that both are to be "multiplied" by a coefficient "C" (where |C| is not a power of two), the string bits are 'pre-combined' such that if both='0', then the "multiplication" produces "0", else if exactly one is set, it produces "C", else it produces "2C". Triples of 1-bit strings may also be handled in a similar manner. This may also be extended to multi-bit strings;

d) If there are two pairs of 1-bit strings that match the 'b' condition, (extended to also include powers of 2), then these bits may be pre-combined to create one of the 5 possible outcomes, "0", "−C", "C", "−2C" or "2C".

e) In cases such as c) and d) combined results, e.g. possibly 2C, that have a magnitude larger than b or floor(b/2), may instead be mapped to an equivalent value, mod b, that has a smaller magnitude;

f) For 1-bit strings with "multiplier" C the multiplication be done as an addition of "0 or C" depending on the bit in the string (i.e. it's a simplified version of (ii) above) or, if not done at the earlier stage, the coefficient may be split up and the input bit used more than once:

f-i) the "C" is broken into a minimal set of (signed) powers of 2 and each is fed back to help create new strings for step (a); or f-ii) a combination of splitting off some number of powers of 2 and leaving a residual non-power of 2 'C' (which can be potentially be grouped as per options (b) through (d) or handled as in (e) above), e.g. where C=12, this can be considered to be 16−4 (as 16 and 4 are both powers of two).

To demonstrate the heuristic-metric-based option, (iv), consider the following example with b=41 and a∈[0, $2^{14}$−1]. Using just the (ii) option, the mapping of input bits to coefficients is:

| | $V_i$ | | | | | | | | | | | | | |
|---|---|---|---|---|---|---|---|---|---|---|---|---|---|---|
| | $V_{13}$ | $V_{12}$ | $V_{11}$ | $V_{10}$ | $V_9$ | $V_8$ | $V_7$ | $V_6$ | $V_5$ | $V_4$ | $V_3$ | $V_2$ | $V_1$ | $V_0$ |
| Option (ii) choice | −8 | −4 | −2 | −1 | 20 | 10 | 5 | −18 | −9 | 16 | 8 | 4 | 2 | 1 |

By summing the negative and summing the positive values, it can be seen that the range of values this will produce is [−42, 66], which requires an 8-bit signed number. If option (iv) is used, employing a metric that (1) uses option (a) to prefer to minimise the number of bits needed to represent the range and then, (2) in the event of a tie, applies (b), and then, in the event of a further tie, uses (d), then 'exhaustively' testing all $2^{14}$ combinations will find that replacing $V_9$'s coefficient, 20, with the larger magnitude but congruent value, −21, will produce the range, [−63, 46]. This, range, though larger, actually requires only 7 bits.

Although the above can be done exhaustively, for certain metrics, it is usually unnecessary. If the aim is to minimise the extremes of the range then the following steps can be taken to reduce the 'exhaustive' evaluation cost by a considerable degree:

1. Those bits which, by default, map to complementary coefficients (in the example above, $V_3$ and $V_{13}$ are such a pair as they map to 8 and −8 respectively) can be assumed to choose the default value, and removed from the 'exhaustive' search.
2. Within the remaining values, if there exists a set of negative (alternatively, positive) coefficients, the set not having repeated values, that sums to the same magnitude as a positive (alternatively, negative) coefficient also in the remaining values, then all of those values can be removed from the 'exhaustive search'. Step 2 is repeated until no such sets remain. Although no such example exists in the b=41 and a E [0, $2^{14}$−1] case, using b=21, would find matches between coefficients {1 & 4} and −5, and {2 & 8} and −10.

The various combinations of the remaining bits, which are usually significantly fewer in number, can then be exhaustively tested and added to the default values of those identified in steps 1 and 2. In the b=41 and a∈[0, $2^{14}$−1] case, only bits $V_4$ through $V_9$ need to be exhaustively tested—reducing the search cost from $O(2^{14})$ to $O(2^6)$ (ignoring the search costs of steps 1 and 2).

The second flow diagram in FIG. 2 shows the second stage 300 of the method which is implemented by addition unit B 104. As described above, the second stage 300 of the method (and addition unit B 104) takes as an input an intermediate value l (or l', l'' for subsequent addition unit Bs). The bits from this intermediate value are then grouped into r' strings using the same techniques as described above with reference to addition unit A, with the exception that option (v), i.e. allowing the coefficient value to go outside the ±b range, may, in various examples, only be used in the first stage 200. In some examples, the same coefficients and strings may be used in the second stage 300 of the method as the first stage 200; however in other examples the bits of the intermediate value may be mapped to different coefficients and/or grouped differently in the second stage 300.

The "multiplication" in the second stage 300 (in block 304) is also performed as described above with reference to the first stage 200, e.g. with the multiplication being performed through a combination of left shifting and additions.

Where there is a sign bit, this is handled slightly differently to the other bits in the intermediate value (which is the input value for the addition unit B). As described above, the sign bit is effectively the value $2^J$ and this can be represented as $-(2^J \bmod b)$ or $b-(2^J \bmod b)$ depending on which gives the best resulting range for the first intermediate value l. The choice of how to handle the value of the sign bit may be incorporated into the search-based metric approach of option (iv).

As noted above, the option choice of (v), i.e. that of using values are greater than b in magnitude, is generally not of benefit in these second stage addition units as this tends to lead to an insufficient decrease in the range of the subsequent intermediate values, especially as this range approaches the magnitude of the modulus, b.

The arrangement of adders within the addition unit B may be similar to that used in the addition unit A and described above; however as there are fewer bits input to addition unit B, fewer adders are used. If there is only one addition unit B in the hardware unit (e.g. as for hardware unit 100 shown in FIG. 1), then the new intermediate value is defined to be the final intermediate value $l^F$.

If there are multiple instances of addition unit B in a hardware unit (e.g. as for hardware unit 110 shown in FIG. 1), each addition unit B operates as described above with reference to FIG. 2, but a subsequent addition unit B takes the output from the previous addition unit B as input (to block 302) instead of the output from addition unit A. It is then the new intermediate value output from the last addition unit B which the final intermediate value $l^F$. As the input range decreases with each addition unit, note that the design of each, e.g. choice of coefficients, can be different.

The third flow diagram in FIG. 2 shows the final stage 400 of the method which is implemented by addition unit C 106. The final stage 400 of the method (and addition unit C 106) takes as an input the final intermediate value l F generated by the final addition unit B 104 (or the sole addition unit B where there is only one). If for a given case, the value $l^F$ is not outside the range [−b, b−1], it is then divided into 2 strings (block 402). The first string comprises all the bits except for the sign bit and the second string comprises only the sign bit.

Each string may then be effectively multiplied by an associated coefficient (in block 404) and the resultant values added together (e.g. as described above) to produce the result R, although in this final stage, the coefficient by which the first string is multiplied is always equal to one and so this multiplication operation can be omitted. In the final stage 400, assuming the $l^F$ can be negative, the sign bit is considered to be a large positive number (as the final result needs to be a positive value in the range [0,b−1]) and the coefficient used is a positive number, where this may be the positive coefficient, −1 multiplied by the negative coefficient for the value of i, i.e. $C_{sign\ bit}=-((2^i \bmod b)-b)=b-(2^i \bmod b)$ or b, i.e. $C_{sign\ bit}=b$.

The arrangement of adders within the addition unit C will be similar to that used in the addition unit A and described above; however as there are many fewer bits input to addition unit C, many fewer adders are used.

In an alternative case, if value $1^F$ is not outside the range [−b,b], unit C can be implemented by performing the calculation described above to calculate a first candidate output result $R_1$ (e.g. by dividing into two strings, where the second string comprises only the sign bit, multiplying the second string by an associated coefficient and adding the resultant string to the first string) and additionally testing $1^F$ for equality with b, and in the event that $1^F=b$ setting the result R to be equal to 0 instead of the first candidate output result (i.e. as described above, if the intermediate value is equal to b then the result is 0). If instead, the value $1^F$ is not outside the range [0, b], there is no second string (e.g. as the sign bit is always zero) and so unit C can be implemented by simply testing $1^F$ for equality with b, and in the event that $1^F=b$ setting the result R to be equal to 0 instead of $1^F$.

In another alternative case, if the $1^F$ range is not outside the range [−b, 2b−1], unit C instead calculates the first candidate output result $R_1$ (as described above) and an alternative candidate result $R_2$ given by $R_1$−b or $1^F$−b and then returns $R_2$, if that is non-negative, else returns $R_1$. If instead, the value $1^F$ is not outside the range [0, 2b−1], there is no second string (e.g. as the sign bit is always zero) and $R_1=1^F$. Unit C can be implemented by calculating the alternative candidate result, $R_2$, as above and then returning $R_2$, if that is non-negative, else returning $R_1$.

Figure 3:
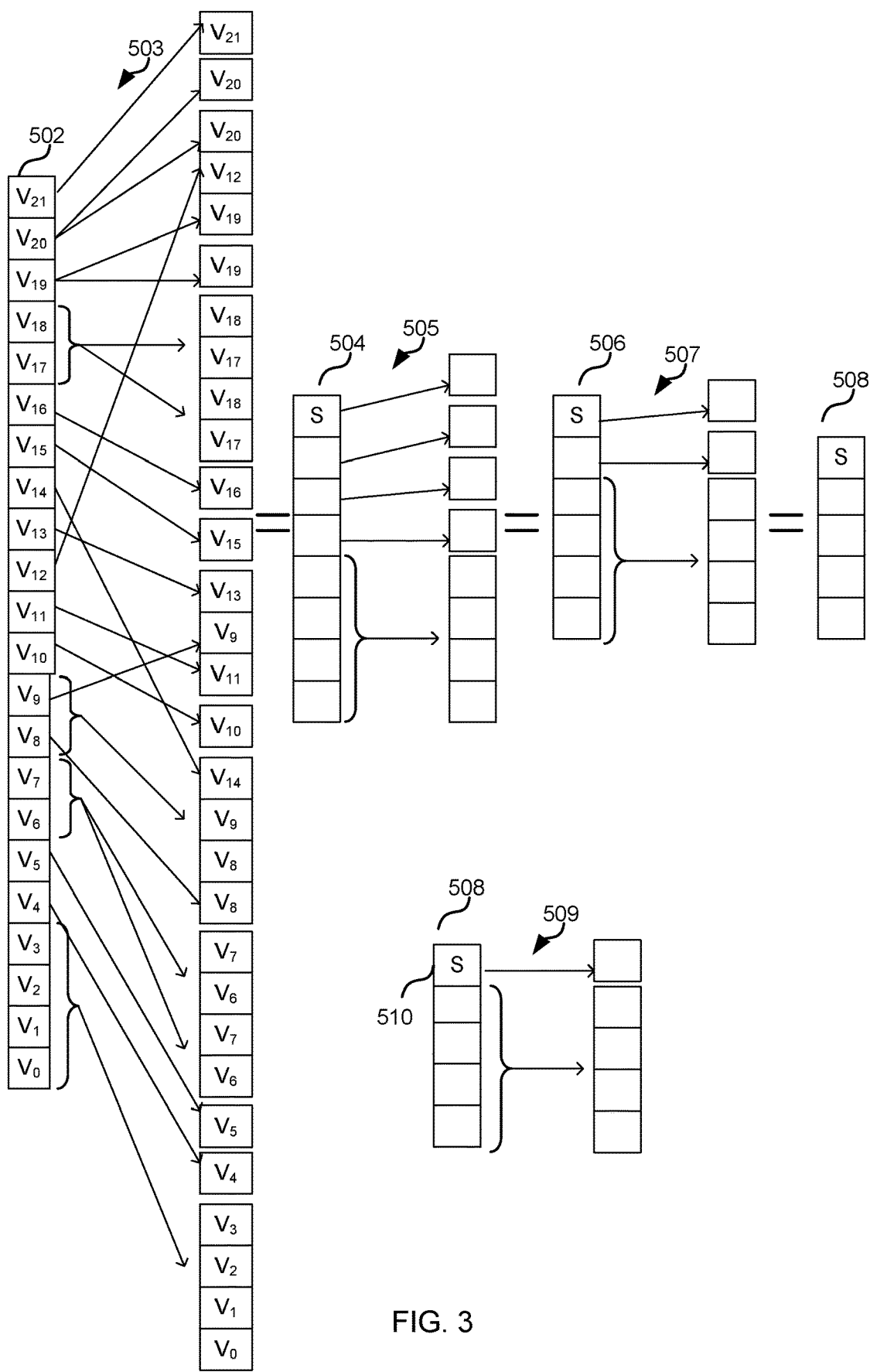
FIG. 3 shows schematic diagrams illustrating an example of modulo calculation with respect to a constant b=5.

An example implementation, in which the input bits are mapped to coefficients according to option (ii) above, the bits then gathered into strings can be demonstrated with the following example, which is shown in the schematic diagram of FIG. 3, for b=23 and n=22.

As in the previous examples, the addition unit A 102, is defined by assigning coefficients to each of the 22 input bits 502 according to one of the given options. In this example, option (iv) is chosen, to create the following coefficients:

| | | | | | Input | | | | | |
|---|---|---|---|---|---|---|---|---|---|---|
| $V_{10}$ | $V_9$ | $V_8$ | $V_7$ | $V_6$ | $V_5$ | $V_4$ | $V_3$ | $V_2$ | $V_1$ | $V_0$ |
| Coefficient −11 | 6 | 3 | −10 | −5 | 9 | −7 | 8 | 4 | 2 | 1 |

| | | | | | Input | | | | | |
|---|---|---|---|---|---|---|---|---|---|---|
| $V_{21}$ | $V_{20}$ | $V_{19}$ | $V_{18}$ | $V_{17}$ | $V_{16}$ | $V_{15}$ | $V_{14}$ | $V_{13}$ | $V_{12}$ | $V_{11}$ |
| Coefficient −11 | 6 | 3 | −10 | −5 | 9 | −7 | 8 | 4 | 2 | 1 |

These coefficients will result in a range for l of [−66, 66], which requires a signed 8 bit value 504 (i.e. 8 bits including the sign bit), and may be grouped into strings using the approaches described above. One possible result using a 'bucket' approach would be of the form below, as expressed in VHDL (wherein, "&" is the VHDL bit concatenation operator, and "ChooseVal2xOrZero" is a user defined 'mux' function that, dependant on the values of the first two parameters, returns either 0, 1×, or 2× the third parameter. This "ChooseVal2xOrZero" is equivalent to the type of bit expressions described previously with reference to the second variant above. This is shown by the arrows 503 in FIG. 3.

I<=signed("0000" & V(3 downto 0))
 +signed("0000" & V(14 downto 14) & V(9 downto 8) & V(8 downto 8))
 +signed("00000" & V(13 downto 13) & V(9 downto 9) & V(11 downto 11))
 +signed("00000" & V(20 downto 20) & V(12 downto 12) & V(19 downto 19))
 −signed("0000" & V(7 downto 6) & V(7 downto 6))
 −signed("0000" & V(18 downto 17) & V(18 downto 17))
 +to_signed(ChooseVal2xOrZero(V(19), V(20), +2), 4)
 +to_signed(ChooseVal2xOrZero(V(4), V(15), +7), 5)
 +to_signed(ChooseVal2xOrZero(V(5), V(16), +9), 6)
 −to_signed(ChooseVal2xOrZero(V(10), V(21), +11), 6);

The second stage 300, as implemented by addition unit B 104, takes l 510 as an input and determines mappings from bits to coefficients. Again using option (iv) with suitable heuristic metric, results in:

| | Input | | | | | | | |
|---|---|---|---|---|---|---|---|---|
| | $I_7$.SIGNBIT | $I_6$ | $I_5$ | $I_4$ | $I_3$ | $I_2$ | $I_1$ | $I_0$ |
| Coefficient | 10 | −5 | 9 | −7 | 8 | 4 | 2 | 1 |

This is also grouped into strings and summed to produce l'. An example result is (where ChooseValOrZero is mathematically equivalent to "parameter1×parameter2", but is achieved by appropriate arrangement of input bits) as shown below and by the arrows 505 in FIG. 3.

Idash<=signed("00"&I(3 downto 0))
 −to_signed(ChooseValOrZero(I(6), +5), 4)
 −to_signed(ChooseValOrZero(I(4), +7), 4)
 +to_signed(ChooseValOrZero(I(5), +9), 5)
 +to_signed(ChooseValOrZero(I(7), +10), 5);

The range of l' is computed. Although the range computation method used for the initial summation in Unit A, which as noted previously, which may be performed using [Σ(AllNegativeValues), Σ(AllPositiveValues)], and if applied to l' would yield [−12, 34], could be used, this is less desirable.

Instead the approach of (or at least the equivalent of) stepping through all unique values of the range of l, which in the example is [−66, 66], is taken, wherein each value is mapped according to the sum of the equivalent coefficients of each set bit. When this approach is taken, the range of l' is determined to be [−12, 29]. It will be appreciated that this requires one fewer bits to represent than the 'naïve' approach, 6 bits 506 versus 7 bits, and thus can save evaluation costs in the following stage(s).

Assuming that, in this example, the target is to produce $1^F$ in the range [−b,b−1], at least one more additional Unit B stage is required. Repeating the process, provides a coefficient mapping of:

| Input | | | | | | |
|---|---|---|---|---|---|---|
| | I'$_5$.SIGNBIT | I'$_4$ | I'$_3$ | I'$_2$ | I'$_1$ | I'$_0$ |
| Coefficient | −9 | −7 | 8 | 4 | 2 | 1 |

Combining into strings and 'multiplying' is achieved with the following example expression (as indicated by the arrows 507):

IFinal<=signed('0'&Idash(3 downto 0))
  −to_signed(ChooseValOrZero(Idash(4), +7), 4)
  +to_signed(ChooseValOrZero(Idash(5), −9), 5);

Evaluating this coefficient mapping over the range [−12, 29] of P, produces the resulting range [−16, 15]. As this is within [−b,b−1], this thus meets the chosen target for $I^F$.

The final stage 400, as implemented by addition unit C 106, takes l'=IF 508 as its input and divides it into 2 strings (in block 402, as indicated by arrows 509). The coefficient for the first string will always be equal to one and so only the second string (which contains only the sign bit 510), bit 4, is multiplied by a coefficient (in block 404). In this example, the second string is multiplied by a coefficient which is here given by C_(sign bit)=−((2$^i$ mod b)−b)=+7.

```
Result <= signed('0'& IFinal ( 3 downto 0))
       + to_signed(ChooseValOrZero( IFinal ( 4), +7), 4);
```

In the above example, two unit B steps were required (as represented by arrows 505 and 507 in FIG. 3), but it will be appreciated that this will depend on the size of the initial input number and the modulus.

In the previous example, the target was to produce IF in the range [−b,b−1], but alternatives, with appropriate modifications to unit C, may be used. If, through suitable selection of coefficients, an $I^F$ intermediate value can produce the range, [0, b], (where it is assumed b can be represented with b bits) then unit C may be modified as per the following:

```
Result <= to_signed(0, bbits)
       when (IFinal = to_signed(b, bbits))
       else IFinal;
```

Another alternative is to support the wider range, $I^F \in [-b, 2b-1]$, with the following approach (expressed here in pseudo code), which requires two multi-bit multiplexers, and a single adder unit.

```
IF (SignbitIsSet(I$^F$)) THEN
{
    Result = I$^F$ + PositveVersionOfSignBit;
}
ELSE
{
    TempResult = I$^F$ − b;
    Result = (TempResult < 0) ? I$^F$ : TempResult;
}
```

In the methods described above, coefficients are selected in the design stage and the effective multiplication of strings by these coefficients is implemented in the addition units although, as described above, the hardware logic may not explicitly perform any multiplication operation but instead use a combination of additions and left-shifts. The following proof demonstrates that it is always possible to choose coefficients (which may also be referred to as residuals) in each stage such that the ultimate result, R, will be in the range [0, b−1]. Furthermore, although the units are referred to as addition units, it will be appreciated that as described they may also perform subtraction.

Given an arbitrary interval [x,y] (where x≤0 and y≥0), whose values can be represented by an m-bit signed number, two types of cycle are defined which can be performed on the signed number. After every cycle, the output is another signed number, which holds values in a new range which can at least be contained by the interval [x',y']. This range is a consequence of the choices which are made for the coefficients (or residues) of each bit of the input signed m-bit number.

An arbitrary interval [x,y] can be mapped to an interval of this type (i.e. one where x≤0 and y≥0), without changing the modulo b values, by shifting the interval along the number line by a sufficient multiple of b—e.g. adding k*b to x and y. If a sufficient multiple cannot be found, that implies that there exists a multiple of b such that the shifted interval will be contained in the interval [0,b−1] and no further range reduction work need be done.

A 'positive range reduction' cycle assumes y>b−1 and results in y'=y−1 and x'=min(x,−b+1)—this can be achieved by looking at the signed bit representation of y and finding a high bit in it (y>b−1>0 so this bit will exist). Say this bit has value 2^i—map this to the residue 2^i−b. Now map the signed bit, whose value is −2^(m−1) to the residue −2^(m−1)+b—all other 2^i bit values are mapped to themselves (so no multiple of b is added/subtracted) The output range of this cycle will then be guaranteed to be in the interval [x',y'].

A 'negative range reduction' cycle assumes that x<0 and results in x'=min(x+b,0) and y'=max(y,b−1)—similarly to the cycle above, this can be achieved by mapping the sign bit −2^(m−1) to −2^(m−1)+b and mapping all other bits to themselves (so no multiple of b is added/subtracted).

So given [x,y] it is possible to keep applying these positive range reduction and negative range reduction cycles to squash the range of the interval until the output of a cycle lies in the range [−b+1,b−1]. We can then apply a final 'negative range reduction' cycle (equivalent to the final stage 400 described above) to get into the required [0,b−1] range, thus concluding the existence proof.

A further example can be described with n=10 and b=15 which demonstrates how two (or more) bits of a value input to an addition unit (e.g. a first or second addition unit) can be pre-combined to simplify the hardware. This example uses some of the techniques (b)-(d) described above. The input number can be expressed as: $V_9V_8V_7V_6V_5V_4V_3V_2V_1V_0$.

The coefficients, mod 15, are respectively, 2, 1, −7, 4, 2, 1, −7, 4,2,1 and forming strings and multiplying, results in the following expression:

$$"V_2V_1V_0"*1 + "V_3"*-7 + "V_6V_5V_4"*1 + "V_7"*-7 + "V_9V_8"*1$$

Using the multiply and shift method (as in (a) above), could result in the expression:

000$V_2V_1V_0$
−000$V_3V_3V_3$
+000$V_6V_5V_4$
−000$V_7V_7V_7$
+0000$V_9V_8$

Alternatively, considering the sub-expression $$("V_3"*7 + "V_7"*7).$$

This can be represented as

```
IF(V₃=0 and V₇=0) then
    result=0
else if(V₃=1 and V₇=1) then
    result = 14
else
    result = 7
endif
``` i.e. the results are one of "000000", "000111" or "001110".

This can alternatively be expressed as:

00PQQR where $R = V_3 \text{ xor } V_7$ $Q = V_3 \text{ or } V_7$ $P = V_3 \text{ and } V_7$ and where these three logic operations (or, and, xor) can be implemented in simple hardware.

Consequently the original sum above can be modified to produce:

$000V_2V_1V_0$
$+000V_6V_5V_4$
$+0000V_9V_8$
$-00PQQR$

And implementing this may result in a reduction in the necessary hardware (e.g. fewer adders are required). Whilst the gain in this particular example may not be that significant, in other examples where multiple bits may be pre-combined (e.g. in pairs) using simple logic elements (rather than just the two bits Viand $V_7$) larger savings in hardware area may be achieved.

The methods described above may be used for modulo calculation a mod b where b is a constant.

The hardware logic described above and shown in FIG. 1 performs modulo calculation in a manner which enables hybrid implementations, i.e. the method may be implemented in a manner which is optimal for speed or in a manner which is optimal for size (i.e. area).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. An apparatus comprising hardware logic arranged to perform modulo calculation with respect to a constant value b, the hardware logic comprising a unit arranged to:
   receive an input n-bit value;
   generate at least one string from one or more bits of the value and a corresponding coefficient, wherein the corresponding coefficient comprises a selected one of $2^i$ mod b and $(2^i \bmod b) - b$ having a smaller absolute magnitude and where i is a bit index of a least significant input bit in the string;
   add together the at least one string and one or more further strings to generate an output value; and
   output the output value.

2. The apparatus according to claim 1, wherein the unit is arranged to generate at least one string from one or more bits of the value and a corresponding coefficient by grouping the bits of the value received by the unit into a plurality of strings to minimize a range of possible values of the output value.

3. The apparatus according to claim 1, wherein at least one of the strings generated in the unit is generated from a plurality of contiguous bits from the value received by the unit.

4. The apparatus according to claim 1, wherein at least one of the strings generated in the unit is generated from a plurality of non-contiguous bits from the value received by the unit.

5. The apparatus according to claim 1, wherein at least one of the strings generated in the unit is generated from one or more bits of the value and at least one a repeated bit.

6. The apparatus according to claim 1, wherein at least one of the strings generated in the unit is generated from bits arranged in a different order to the input value.

7. The apparatus according to claim 1, wherein at least one bit of the value received by the unit is used to generate two or more different strings in the unit.

8. The apparatus according to claim 1, wherein the unit is arranged to generate at least one string from one or more bits of the value and a corresponding coefficient by
   pre-combining two or more bits of the value received by the unit using a logic element and generating the string from at least the pre-combined bits and the corresponding coefficient.

9. The apparatus according to claim 1, wherein the corresponding coefficient for a bit of the input value is one of:
   i. a positive coefficient value in [0, . . . ,b−1] which is congruent to $2^i$ mod b;
   ii. a coefficient equal to $(2^i \bmod b)$ or $((2^i \bmod b)-b)$ which has a smaller absolute magnitude and where i is a bit index for the bit;
   iii. whichever of $(2^i \bmod b)$ or $((2^i \bmod b)-b)$ has a larger absolute magnitude provided it can be formed from fewer powers of two via addition or subtraction than the smaller magnitude value from (ii) or is less in magnitude than b and is a 2× multiple of another bit's coefficient;
   iv. a coefficient according to (ii) or (iii), wherein the coefficient is selected by evaluating a plurality of combinations of coefficient choices for each bit using a cost metric;
   v. a coefficient selected according to any of (i)-(iv) which is a signed power of two and has an absolute magnitude which does not exceed K*b where K is a natural number; and
   vi. a coefficient selected according to any combination of (i)-(v) to minimise the cost metric.

10. The apparatus according to claim 7, wherein the cost metric comprises at least one of:
    a) a number of bits required to represent any value in the range $[Min_x, Max_x]$;
    b) a result of evaluating $(Max_x - Min_x)$;
    c) a result of evaluating $\max(-Min_x, Max_x)$; and
    d) a sum over all bits of a cost parameter associated with each coefficient, the cost parameter comprising a size of a smallest set of powers of two such that there exists an expression involving sums and differences of that set which equates to the coefficient.

11. The apparatus according to claim 1, wherein the apparatus is a processor.

12. The apparatus according to claim 1 wherein the hardware logic comprises a single unit only.

13. The apparatus according to claim 1, wherein the input n-bit value is a value output by an immediately previous unit.

14. The apparatus according to claim 1, wherein the output value is in a pre-determined terminating range.

15. The apparatus according to claim 1, wherein the pre-defined terminating range is one of [−b, b−1], [−b, b], [0, 2b−1] or [−b, 2b−1].

16. A non-transitory computer readable storage medium having stored thereon computer readable instructions that, when processed at a computer system for generating a manifestation of an integrated circuit, cause the computer system to generate a manifestation of an integrated circuit arranged to perform modulo calculation, the integrated circuit comprising a unit arranged to:

receive an input n-bit value;

generate at least one string from one or more bits of the value and a corresponding coefficient, wherein the corresponding coefficient comprises a selected one of $2^i$ mod b and $(2^i$ mod b$)-$b having a smaller absolute magnitude and where i is a bit index of a least significant input bit in the string;

add together the at least one string and one or more further strings to generate an output value; and output the output value.

17. A method of manufacturing, using an integrated circuit manufacturing system, an integrated circuit comprising hardware logic arranged to perform modulo calculation with respect to a constant value b, the hardware logic comprising a unit arranged to receive an input n-bit value;

generate at least one string from one or more bits of the value and a corresponding coefficient, wherein the corresponding coefficient comprises a selected one of $2^i$ mod b and $(2^i$ mod b$)-$b having a smaller absolute magnitude and where i is a bit index of a least significant input bit in the string;

add together the at least one string and one or more further strings to generate an output value; and output the output value.

* * * * *